US012657074B2

(12) United States Patent
Devta

(10) Patent No.: US 12,657,074 B2
(45) Date of Patent: Jun. 16, 2026

(54) SYSTEM AND METHOD FOR EXPOSING FEATURES OF INTEGRATION PLATFORM ADAPTERS AS FIRST-CLASS ACTIONS IN AN ORCHESTRATION TEMPLATE

(71) Applicant: ORACLE INTERNATIONAL CORPORATION, Redwood Shores, CA (US)

(72) Inventor: Prakash Kumar Devta, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/143,944

(22) Filed: Jan. 7, 2021

(65) Prior Publication Data

US 2022/0214931 A1 Jul. 7, 2022

(51) Int. Cl.
G06F 9/54 (2006.01)
H04L 41/0266 (2022.01)
H04L 67/10 (2022.01)

(52) U.S. Cl.
CPC .............. *G06F 9/541* (2013.01); *G06F 9/546* (2013.01); *H04L 41/0266* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 6,208,345 B1 * | 3/2001 | Sheard ...................... G06F 8/34 |
| | | | 709/201 |
| 10,432,631 B2 | 10/2019 | Kaushal | |
| 10,585,678 B2 | 3/2020 | Devta | |
| 11,531,674 B2 | 12/2022 | Devta | |
| 11,546,413 B2 | 1/2023 | Devta | |
| 2012/0030689 A1 * | 2/2012 | Li ........................... G06F 9/541 |
| | | | 719/318 |
| 2012/0131181 A1 * | 5/2012 | Birkler ................. G06F 9/5083 |
| | | | 709/224 |
| 2014/0282353 A1 * | 9/2014 | Jubran ...................... G06F 8/71 |
| | | | 717/101 |
| 2016/0232042 A1 * | 8/2016 | Ritter ...................... G06F 8/427 |
| 2017/0264612 A1 | 9/2017 | Kaushal | |
| 2019/0324763 A1 | 10/2019 | Devta | |
| 2021/0166171 A1 * | 6/2021 | Jobér ...................... G06F 9/541 |
| 2021/0203714 A1 | 7/2021 | Devta | |
| 2021/0373915 A1 | 12/2021 | Devta | |
| 2022/0038367 A1 | 2/2022 | Devta | |
| 2022/0103648 A1 | 3/2022 | Deshpande | |
| 2022/0237197 A1 | 7/2022 | Devta | |

* cited by examiner

*Primary Examiner* — Chat C Do
*Assistant Examiner* — William C Wood
(74) *Attorney, Agent, or Firm* — TUCKER ELLIS LLP

(57) ABSTRACT

Systems and methods for exposing features of integration platform adapters as first-class actions in orchestration template are provided. Exposing features of an adapter as first-class actions in the orchestration template can allow integration designers focus on the business logic being worked upon and pick the correct feature from the adapter based on the context. As the features of adapters are exposed as first-class actions, even new features will be visible to the user along with context sensitive help explaining usage of the feature.

17 Claims, 6 Drawing Sheets

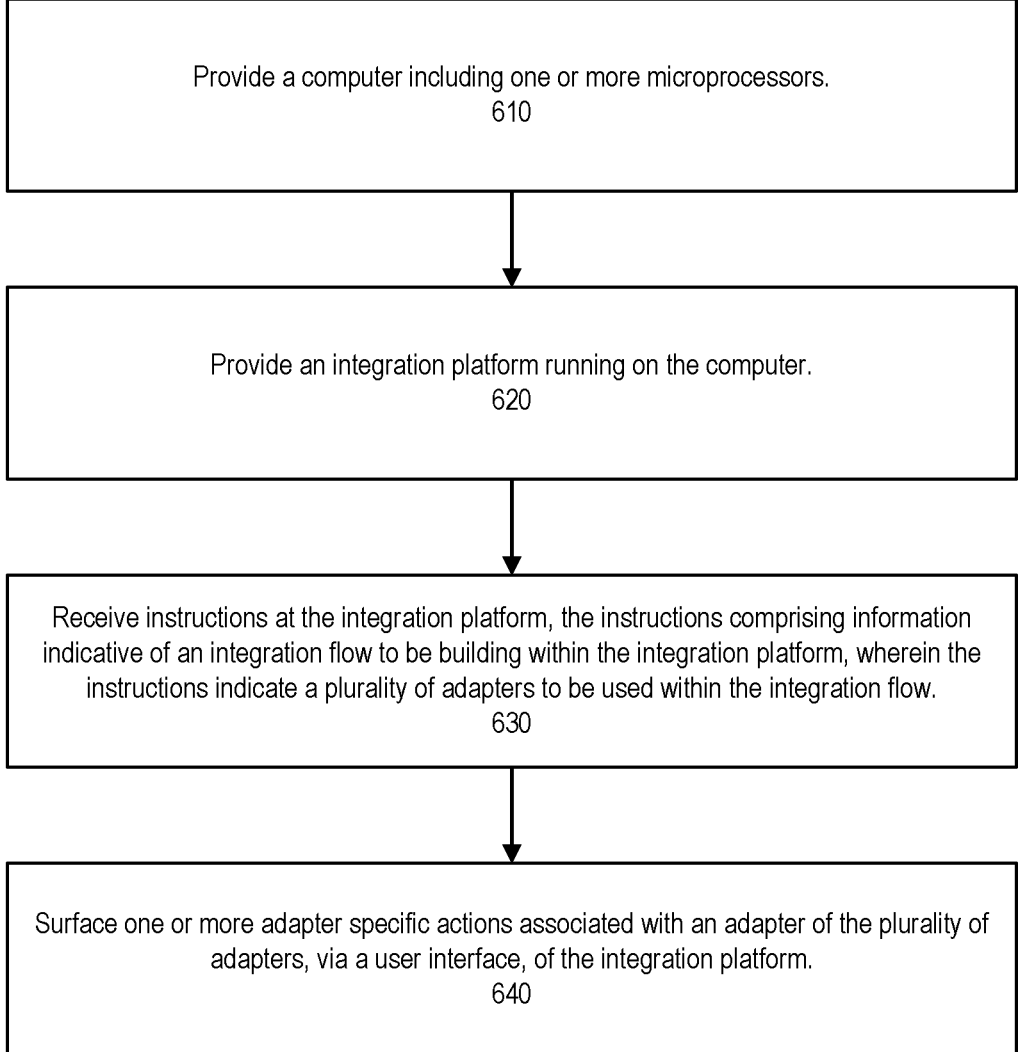

Provide a computer including one or more microprocessors.
610

Provide an integration platform running on the computer.
620

Receive instructions at the integration platform, the instructions comprising information indicative of an integration flow to be building within the integration platform, wherein the instructions indicate a plurality of adapters to be used within the integration flow.
630

Surface one or more adapter specific actions associated with an adapter of the plurality of adapters, via a user interface, of the integration platform.
640

*Figure 6*

SYSTEM AND METHOD FOR EXPOSING FEATURES OF INTEGRATION PLATFORM ADAPTERS AS FIRST-CLASS ACTIONS IN AN ORCHESTRATION TEMPLATE

COPYRIGHT NOTICE

FIELD OF INVENTION

Embodiments of the invention are generally related integration cloud services, and in particular, systems and methods for exposing features of integration platform adapters as first-class actions in an orchestration template.

BACKGROUND

Integration cloud services (ICS) (e.g., Oracle Integration Cloud Service) are simple and powerful integration platforms in the cloud that assist in the utilization of products, such as Software as a Service (SaaS) and on-premises applications. ICS can be provided as an integration platform as a service (iPaas) and can include a web-based integration designer for point and click integration between applications, a rich monitoring dashboard that provides real-time insight into the transactions.

SUMMARY

Systems and methods for exposing features of integration platform adapters as first-class actions in orchestration template are provided. Exposing features of an adapter as first-class actions in the orchestration template can allow integration designers focus on the business logic being worked upon and pick the correct feature from the adapter based on the context. As the features of adapters are exposed as first-class actions, even new features will be visible to the user along with context sensitive help explaining usage of the feature.

In accordance with an embodiment, systems and methods for exposing features of integration platform adapters as first-class actions in an orchestration template are provided. An exemplary method can provide a computer including one or more microprocessors. The method can provide an integration platform running on the computer. The method can receive instructions at the integration platform, the instructions comprising information indicative of an integration flow to be building within the integration platform, wherein the instructions indicate a plurality of adapters to be used within the integration flow. The method can surface one or more adapter specific actions associated with an adapter of the plurality of adapters, via a user interface, of the integration platform.

BRIEF DESCRIPTION OF THE DRAWINGS

FIG. 6 is a flowchart of a method for exposing features of integration platform adapters as first-class actions in an orchestration template, in accordance with an embodiment.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Integration platform as a service, for example, Oracle Integration Cloud Service (ICS), can provide a cloud-based platform for building and deploying integrations flows that connect applications residing in the cloud or on-premises. Integration Cloud Service FIG. 1 illustrates an ICS platform for designing and executing an ICS integration flow, in according with an embodiment.

Figure 1:
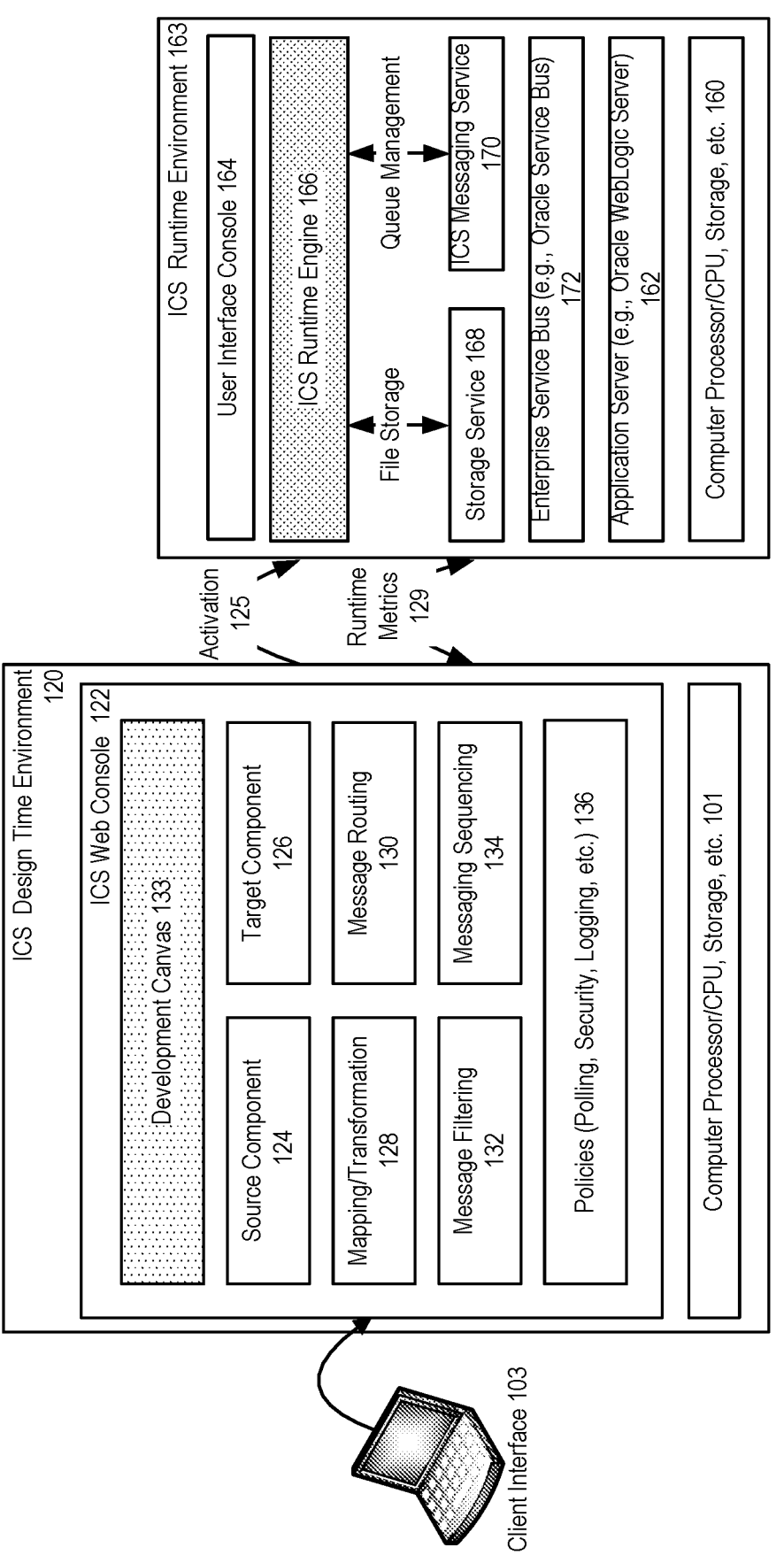
FIG. 1 illustrates an integration cloud service in accordance with an embodiment.

As shown in FIG. 1, the ICS platform can include a design-time environment 120, and a runtime environment 163. Each environment can execute on a computer including one or more processors, for example a computer 101 or 106.

In accordance with an embodiment, the design-time environment includes an ICS web console 122, which provides a browser-based designer to allow an integration flow developer to build integrations using a client interface 103.

In accordance with an embodiment, the ICS design-time environment can be pre-loaded with connections to various SaaS applications or other applications, and can include a source component 124, and a target component 126. The source component can provide definitions and configurations for one or more source applications/objects; and the target component can provide definitions and configurations for one or more target applications/objects. The definitions and configurations can be used to identify application types, endpoints, integration objects and other details of an application/object.

As further shown in FIG. 1, the design-time environment can include a mapping/transformation component 128 for mapping content of an incoming message to an outgoing message, and a message routing component 130 for controlling which messages are routed to which targets based on content or header information of the messages. Additionally, the design-time environment can include a message filtering component 132, for controlling which messages are to be routed based on message content or header information of the messages; and a message sequencing component 134, for rearranging a stream of related but out-of-sequence messages back into a user-specified order.

In accordance with an embodiment, each of the above of the described components, as with the source and target components, can include design-time settings that can be persisted as part of a flow definition/configuration.

In accordance with an embodiment, a flow definition specifies the details of an ICS integration flow; and encompasses both the static constructs of the integration flow (for example, message routers), and the configurable aspects (for example, routing rules). A fully configured flow definition and other required artifacts (for example, jca and .wsdl files) in combination can be referred to as an ICS project. An ICS project can fully define an integration flow, and can be implemented by an underlying implementation layer.

In accordance with an embodiment, a policies component 136 can include a plurality of policies that govern behaviors of the ICS environment. For example, a polling policy can be configured for source-pull messaging interactions (i.e. query style integrations) for a source application, to invoke an outbound call to the source application via a time-based polling.

In accordance with an embodiment, other policies can be specified for security privileges in routing messages to a target application; for logging message payloads and header fields during a flow execution for subsequent analysis via a monitoring console; and for message throttling used to define a number of instances that an enterprise service bus (ESB) service can spawn to accommodate requests. In addition, policies can be specified for monitoring/tracking an integration flow at a flow level; and for validating messages being processed by the ICS platform against a known schema.

In accordance with an embodiment, an integration developer can drag and drop a component on a development canvas 133 for editing and configuration, for use in designing an integration flow.

As further shown, the runtime environment can include an application server 162, an ICS runtime engine 166, a storage service 168 and a messaging service 170 on top of an enterprise service bus component 172. A user interface console 164 can be used to monitor and track performance of the runtime environment.

Figure 2:
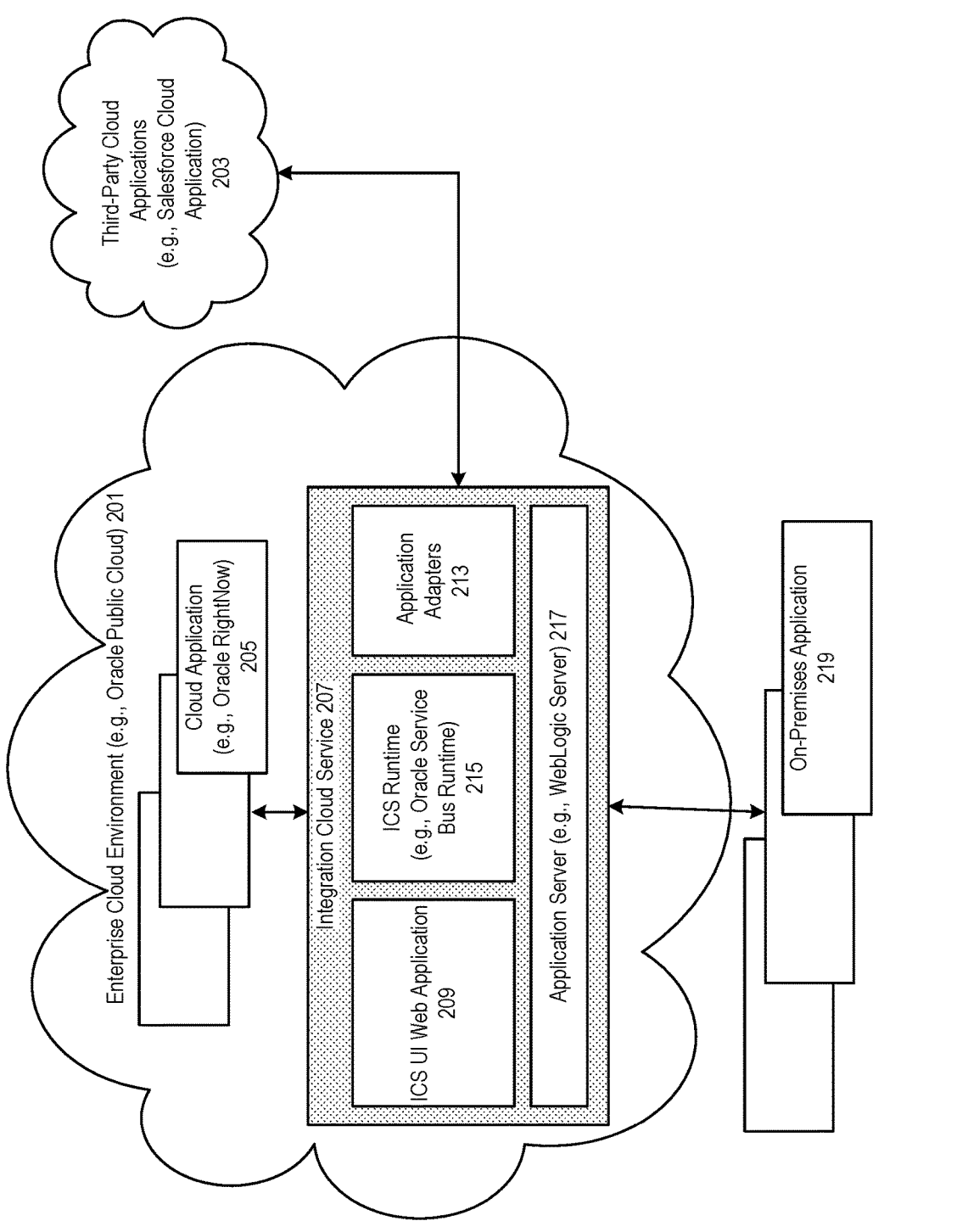
FIG. 2 illustrates an integration cloud service in accordance with an embodiment.

FIG. 2 illustrates an integration cloud service in accordance with an embodiment.

As shown in FIG. 2, an ICS 207 can provide a cloud-based integration service for designing, executing, and managing ICS integration flows. The ICS can include a web application 209 and an ICS runtime 215 executing on an application server 217 in an enterprise cloud environment (for example, Oracle Public Cloud) 201. The web application can provide a design time that exposes a plurality of user interfaces for a user to design, activate, manage, and monitor an ICS integration flow. An activated ICS integration flow can be deployed and executed on the ICS runtime.

In accordance with an embodiment, a plurality of application adapters 213 can be provided to simplify the task of configuring connections to a plurality of applications, by handling the underlying complexities of connecting to those applications. The applications can include enterprise cloud applications of the ICS vendor 205, third-party cloud applications (for example, Salesforce) 103, and on-premises applications 219. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime. A plurality of different types of integration flow patterns can be created using the web UI application, including data mapping integration flows, publishing integration flows, and subscribing integration flows. To create a data mapping integration flow, an ICS user can use an application adapter or an application connection to define a source application and a target application in the development interface, and define routing paths and data mappings between the source and target application. In a publishing integration flow, a source application or a service can be configured to publish messages to the ICS through a predefined messaging service. In a subscribing integration flow, a target application or service can be configured to subscribe to messages from the ICS through the messaging service. Additionally, while the orchestration template can have many invokes and other actions, whereas Map data template has just source and target adapters/connections.

Figure 3:
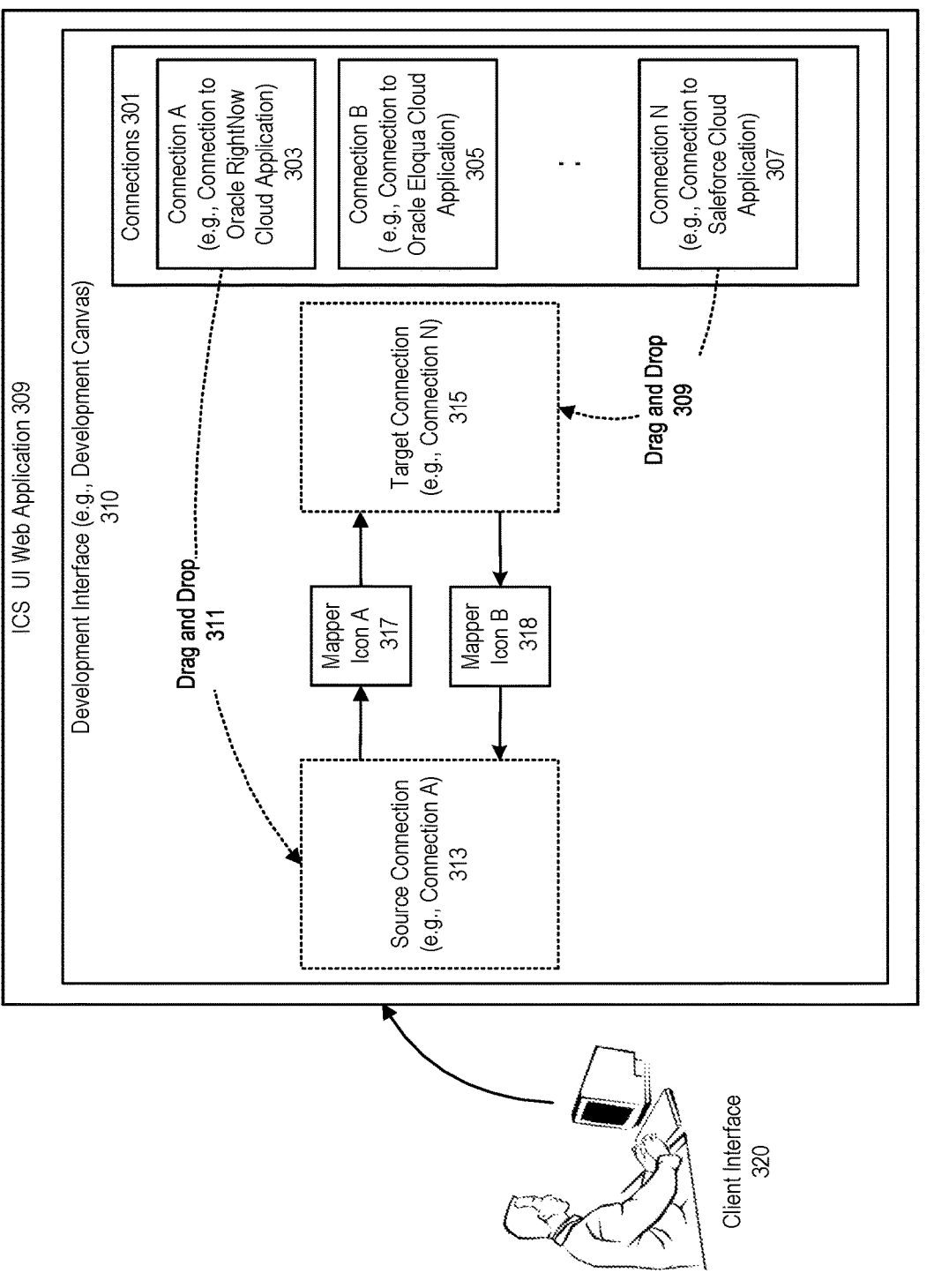
FIG. 3 illustrates an ICS design time, in accordance with an embodiment.

FIG. 3 illustrates an ICS design time, in accordance with an embodiment.

In accordance with an embodiment, a development interface (e.g., a development canvas) 310 in the web UI application can be used by a user 320 to create an ICS integration flow, using a plurality of existing connections 301, for example, connection A 303, connection B 305 and connection N 307.

As shown in FIG. 3, a particular connection (for example, connection A) can be dragged and dropped 311 to the development interface as a source connection 313, and connection N can be dragged and dropped 309 to the development interface as a target connection 315. The source connection can include information required to connect to a source application, and can be used by the ICS to receive requests from the source application. The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappers between the two connections can be enabled, and mapper icons (for example, mapper icon A 317 and mapper icon B 318) can be displayed for use in opening the mappers, so that the user can define how information is transferred between a source and target data objects for both the request and response messages.

In accordance with an embodiment, the mappers can provide a graphical user interface for the user to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. For example, one application uses a specific set of codes to describe countries, while another application uses a different set of codes to describe the same countries. Lookups can be used to map these different codes across the different applications.

As described above, development of an integration flow can be a complex effort requiring various components to be defined before the integration flow can be successfully deployed and executed. Some components within an integration flow are required to be defined while others are optional. Further complicating the development process is that defining optional components may lead to additional required components, and that the required components at any point in time during the development effort may vary, depending upon the order in which the integration components were defined.

Figure 4:
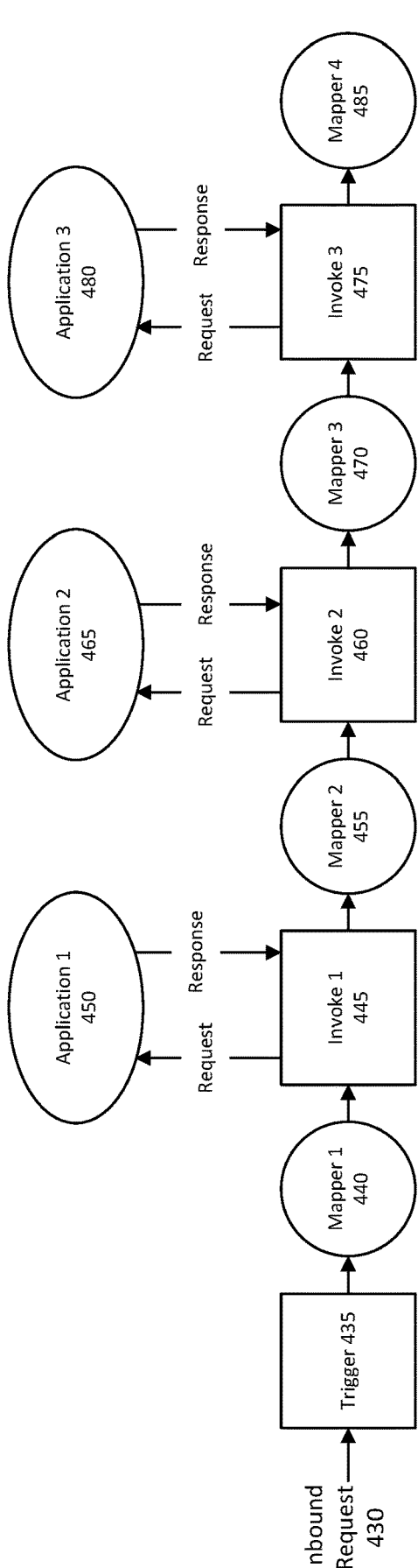
FIG. 4 illustrates a system for exposing features of integration platform adapters as first-class actions in an orchestration template, in accordance with an embodiment.

FIG. 4 illustrates a system for exposing features of integration platform adapters as first-class actions in an orchestration template, in accordance with an embodiment.

In accordance with an embodiment, an orchestration integration flow (i.e., orchestration of applications) can comprise a plurality of application adapters, such as invoke 1 445, invoke 2 460, and invoke 3 475. The orchestration integration flow can additionally comprise a number of mappers, such as mapper 1 440, mapper 2 455, mapper 3 470, and mapper 4 485, which each can map different sets of data, depending upon, e.g., the requirements of the application adapters.

In accordance with an embodiment, each application adapter (i.e., each invoke) can be associated with an external application (or an instance of an external application), such as application 1 450, application 2 465, and application 3 480.

Exposing Features of Integration Platform Adapters as First-Class Actions in an Orchestration Template In accordance with an embodiment, an iPaaS platform makes use of adapters/connectors to interact with target applications. These adapters are used in orchestration flows for solving various business use-cases.

In accordance with an embodiment, most of these adapters are feature rich but the only way to know the features of an adapter is either to use the design time wizard of the adapter or read the product documentation. Also, the way these features are discovered and used in wizard varies from adapter to adapter.

In accordance with an embodiment, exposing features of an adapter as first-class actions (actions that are directly exposed to integration modelers/developers as selectable options) in the orchestration template can allow integration designers focus on the business logic being worked upon and pick the correct feature from the adapter based on the context. As the features of adapters are exposed as first-class actions, even new features will be visible to the user along with context sensitive help explaining usage of the feature.

In accordance with an embodiment, current adapters store operation properties in a file or memory, such as JCA (Java Connection Architecture). Whenever an adapter endpoint is configured, based on the operation and associated configuration selected in the adapter wizard, operation properties are added to the JCA file. This JCA is used for following purposes:

1 At design time, the JCA file acts as the configuration to open the adapter wizard in re-edit mode. In this mode, all configuration of wizard is derived from properties in the JCA file.

2 At runtime, the JCA file acts as the configuration to interact with the target application.

In accordance with an embodiment, first-class actions for features of adapter can be created by using JCA properties specific to the adapter feature. Each first-class action will have specific JCA properties just for it along with a special property to tell to the adapter that this is an action and action based wizard should be rendered and not a full-fledged wizard. Say this property is "mode"="action". This will help the adapter render just the configuration/options specific to the action. Runtime behavior will be the same as that of today.

In accordance with an embodiment, an approach is provided by the present disclosure to generate JCA properties for actions, discover actions and render them is as follows:

1. During adapter development, as adapter code is compiled, action specific JCAs (properties file) can also be added to an adapter jar.

2. Each of these property' files will have the same name as the name of the action.

3. In the adapter metadata file, (cloud-adapter.xml) these actions will be added as XML elements.

In accordance with an embodiment, while rendering the adapter names in the orchestration template, a user interface module of the iPaaS platform can make use of this additional information from the adapter metadata to render adapter specific actions.

In accordance with an embodiment, in another approach, discovery of action specific JCA can be performed dynamically by learning from various implementations by tenants of iPaaS platform. As specific features of adapters are used via full-fledged adapter wizard, the generated JCAs for these features can be aggregated as templates and these templates can be shown as first-class actions in orchestration UI. In an integration cloud, such as Oracle Integration Cloud (OIC), recommendation service, data harvest service, etc., can be used to support this approach. This can ensure that as new features are used by customers, the JCAs of these new features will be available as templates for first-class actions in the integration service platform and then these can be used by all tenants. These templates can be cached in a database or added to adapter jars.

In accordance with an embodiment, whenever an action is selected from the orchestration template, an action specific JCA file is used from the adapter jar to render action specific adapter wizard. In an action specific adapter wizard, UI components not specific to the action can be hidden or disabled. Note that actions can have certain operation properties set to default value and in the wizard user can select specific value as needed by the use case being modelled. The idea is to show action specific UI and make the user experience action specific. An action can be configured with different values in different contexts.

Figure 5:
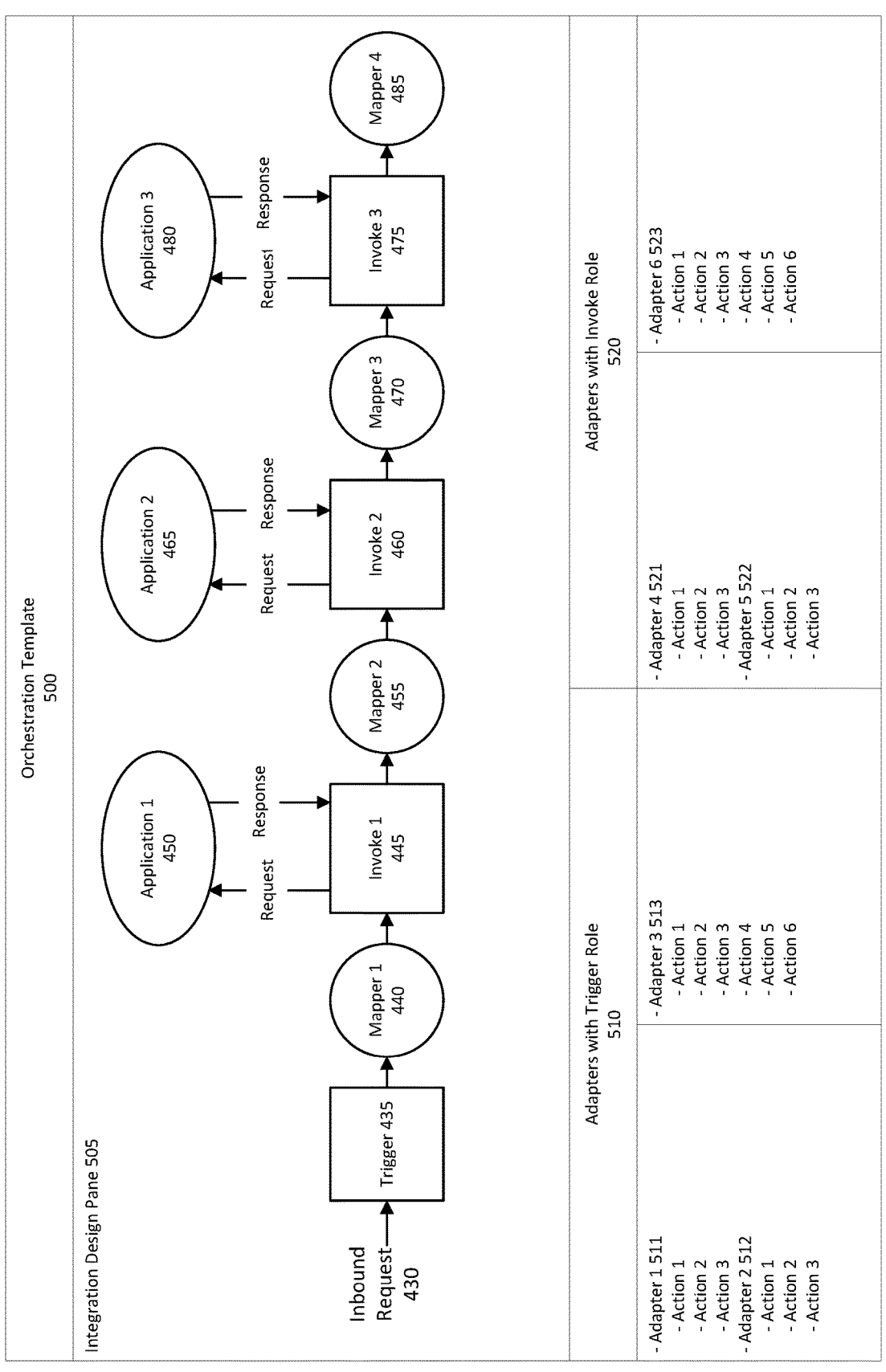
FIG. 5 illustrates a system for exposing features of integration platform adapters as first-class actions in an orchestration template, in accordance with an embodiment.

FIG. 5 illustrates a system for exposing features of integration platform adapters as first-class actions in an orchestration template, in accordance with an embodiment.

In accordance with an embodiment, an integration platform can provide an orchestration template 500 which can provide, for example, a user interface, such as a graphical user interface, that provides an integration design pane 505 that can be used by, e.g., an integration developer or modeler to mode and build an integration (integration flow). Such an integration flow can comprise a number of adapters, such as invokes, mappers, and triggers, where some of such adapters comprise connectors that provided links to applications external to the integration flow.

As depicted in FIG. 5, in accordance with an embodiment, an orchestration integration flow (i.e., orchestration of applications, integration, integration of applications) can comprise a plurality of application adapters, such as invoke 1 445, invoke 2 460, and invoke 3 475. The orchestration integration flow can additionally comprise a number of mappers, such as mapper 1 440, mapper 2 455, mapper 3

470, and mapper 4 485, which each can map different sets of data, depending upon, e.g., the requirements of the application adapters.

In accordance with an embodiment, each application adapter (i.e., each invoke) can be associated with an external application (or an instance of an external application), such as application 1 450, application 2 465, and application 3 480. While shown within the context of the integration design pane 505, the applications, application 1, 2, and 3, can be, in embodiments, external to the integration platform.

In accordance with an embodiment, while a certain number of adapters are shown in the depicted embodiment, one of skill in the art would readily understand that an integration can comprise more or fewer adapters than that show in the Figure.

In accordance with an embodiment, first-class actions for features of adapters of the modeled integration flow can be created by using JCA properties specific to the adapter feature. Each first-class action will have specific JCA properties just for it along with a special property to tell to the adapter that this is an action and action-based wizard can be rendered.

In accordance with an embodiment, based upon the approaches described above, each adapter of the integration flow can have associated therewith a metadata file that comprises the specific actions each adapter supports as XML elements.

In accordance with an embodiment, then, displayed via the user-interface, these XML elements of each adapter can be displayed as first-class actions associated with each adapter.

In accordance with an embodiment, adapters having the role of a trigger in a designed integration flow can be shown, e.g., in pane 510 of the user-interface. There, for example, the actions of Adapter 1 511, Adapter 2 512, and Adapter 3 513 can be displayed individually for a flow developer to select, e.g., none, one, some, or all of the adapter specific actions of each adapter to be used in the developer's integration. That is, for example, a flow developer could select Actions 1 and 2 of Adapter 511, Action 3 of Adapter 512, and Actions 2, 5, and 6 of Adapter 3 513. In this way, the developer can fine-tune the actions each adapter can perform, e.g., with respect to trigger roles within the integration.

In accordance with an embodiment, adapters having the role of invoke within a designed integration flow can be shown, e.g., in pane 520 of the user-interface. There, for example, the adapter specific actions of the adapter connectors with invoke roles (Adapter 4 521, Adapter 5 522, and Adapter 6 523) can be displayed individually for a flow developer to select, e.g., none, one, some, or all of the adapter specific actions of each adapter to be used in the developer's integration. That is, for example, a flow developer could select Actions 1 and 2 of Adapter 521, Action 3 of Adapter 522, and Actions 2, 5, and 6 of Adapter 3 523. In this way, the developer can fine-tune the actions each adapter can perform, e.g., with respect to invoke roles within the integration.

FIG. 6 is a flowchart of a method for exposing features of integration platform adapters as first-class actions in an orchestration template, in accordance with an embodiment.

In accordance with an embodiment, the method can, at step 610, provide a computer including one or more microprocessors.

In accordance with an embodiment, the method can, at step 620, provide an integration platform running on the computer.

In accordance with an embodiment, the method can, at step 630, receive instructions at the integration platform, the instructions comprising information indicative of an integration flow to be building within the integration platform, wherein the instructions indicate a plurality of adapters to be used within the integration flow.

In accordance with an embodiment, the method can, at step 640, surface one or more adapter specific actions associated with an adapter of the plurality of adapters, via a user interface, of the integration platform.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for exposing features of integration platform adapters as first-class actions in an orchestration template comprising:
    a computer including one or more microprocessors;
    an integration platform running on the computer;

wherein instructions are received at the integration platform, the instructions comprising information indicative of an integration flow to be built within the integration platform, wherein the instructions indicate a plurality of adapters to be used within the integration flow;
    wherein the instructions indicate a first adapter, the first adapter being associated with a first application external to the integration platform, of the plurality of adapters to be utilized within the integration flow, the first adapter of the plurality of adapters being associated with a set of properties defined within metadata associated with the first adapter, the set of properties comprising at least action properties and runtime properties,
        wherein the first adapter of the plurality of adapters is associated with a role defined within the integration flow;
        wherein the action properties associated with the first adapter of the plurality of adapters comprise at least a set of first-class action properties, wherein each of the set of first-class action properties are compiled during development of the first adapter and marked with specific properties including a property indicating to the first adapter to render an action based wizard for each of the set of first-class action properties; and
    wherein a determined set of a plurality of adapter specific actions associated with the first adapter of the plurality of adapters, the determined set of the plurality of adapter specific actions being selected from the set of properties associated with the first adapter, said selection excluding runtime properties, is displayed, together with associated context sensitive information, as a set of selectable options, via a user interface of the integration platform, each of the determined set of the plurality of adapter specific actions being associated with the defined role of the first adapter within the integration flow, each of the determined set of the plurality of adapter specific actions being defined within a configuration of the first adapter of the plurality of adapters, the configuration being associated with the integration flow, wherein the determined set of the plurality of adapter specific actions are determined based upon an action of the first adapter within the integration flow;
    wherein, based upon a second adapter of the plurality of adapters, the second adapter being associated with a second application external to the integration platform, the second application being different than the first application, having a same defined role within the integration flow, the second adapter of the plurality of adapters being associated with a second set of properties defined within metadata associated with the second adapter, the second set of properties comprising at least action properties and runtime properties, another determined set of a plurality of adapter specific actions, the determined another set of the plurality of adapter specific actions being selected from the second set of properties associated with the second adapter, said selection excluding runtime properties, associated with the second adapter of the plurality of adapters is selected to be displayed, and is displayed as another set of selectable options, together with the display of the determined set of the plurality of adapter specific actions associated with the first adapter of the plurality of adapters;

wherein upon an indication a selection of one of the determined set of the plurality of adapter specific actions being received via the user interface, the configuration of the first adapter of the plurality of adapters is updated and actions of the first adapter of the plurality of adapters within the integration flow are accordingly modified.

2. The system of claim 1, wherein each of the plurality of adapter specific actions associated with the first adapter are stored as extensible markup language (XML) within the metadata associated with the first adapter.

3. The system of claim 2, wherein the first adapter comprises a connection having a trigger role within the integration flow.

4. The system of claim 3, wherein a further instruction is received at the integration platform, the further instruction indicating a selection of another of the plurality of adapter specific actions associated with the first adapter to be used within the integration flow; and wherein upon the selection of the another of the plurality of adapter specific actions associated with the first adapter to be used within the integration flow, the non-selected adapter specific actions are excluded from use within the integration flow.

5. The system of claim 2, wherein the first adapter comprises a connection having an invoke role within the integration flow.

6. The system of claim 5, wherein a further instruction is received at the integration platform, the further instruction indicating a selection of another of the plurality of adapter specific actions associated with the first adapter to be used within the integration flow; and wherein upon the selection of the another of the plurality of adapter specific actions associated with the first adapter to be used within the integration flow, the non-selected adapter specific actions are excluded from use within the integration flow.

7. A method for exposing features of integration platform adapters as first-class actions in an orchestration template, comprising:

providing a computer including one or more microprocessors;

providing an integration platform running on the computer;

receiving instructions at the integration platform, the instructions comprising information indicative of an integration flow to be built within the integration platform, wherein the instructions indicate a plurality of adapters to be used within the integration flow, wherein the instructions indicate a first adapter of the plurality of adapters, the first adapter being associated with a first application external to the integration platform, to be utilized within the integration flow, the first adapter of the plurality of adapters being associated with a set of properties defined within metadata associated with the first adapter, the set of properties comprising at least action properties and runtime properties, wherein the first adapter of the plurality of adapters is associated with a role defined within the integration flow;

wherein the action properties associated with the first adapter of the plurality of adapters comprise at least a set of first-class action properties, wherein each of the set of first-class action properties are compiled during development of the first adapter and marked with specific properties including a property indicating to the first adapter to render an action based wizard for each of the set of first-class action properties;

displaying, as a set of selectable options, a determined set of a plurality of adapter specific actions associated with the first adapter of the plurality of adapters, the determined set of the plurality of adapter specific actions being selected from the set of properties associated with the first adapter, said selection excluding runtime properties, together with associated context sensitive information, via a user interface of the integration platform, each of the determined set of the plurality of adapter specific actions being associated with the defined role of the first adapter within the integration flow, each of the determined set of plurality of adapter specific actions being defined within a configuration of the first adapter of the plurality of adapters, the configuration being associated with the integration flow, wherein the determined set of the plurality of adapter specific actions are determined based upon an action of the first adapter within the integration flow;

based upon a second adapter of the plurality of adapters, the second adapter being associated with a second application external to the integration platform, the second application being different than the first application, having a same defined role within the integration flow, the second adapter of the plurality of adapters being associated with a second set of properties defined within metadata associated with the second adapter, the second set of properties comprising at least action properties and runtime properties, selecting to be displayed another determined set of a plurality of adapter specific actions, the determined another set of the plurality of adapter specific actions being selected from the second set of properties associated with the second adapter, said selection excluding runtime properties, associated with the second adapter of the plurality of adapters, wherein the another determined set of a plurality of adapter specific actions associated with the second adapter are displayed as another set of selectable options together with the display of the determined set of the plurality of adapter specific actions associated with the first adapter of the plurality of adapters; and upon an indication a selection of one of the determined set of the plurality of adapter specific actions being received via the user interface, updating the configuration of the first adapter of the plurality of adapters and accordingly modifying actions of the first adapter of the plurality of adapters within the integration flow.

8. The method of claim 7, wherein each of the plurality of adapter specific actions associated with the first adapter are stored as extensible markup language (XML) within the metadata associated with the first adapter.

9. The method of claim 8, wherein the first adapter comprises a connection having a trigger role within the integration flow.

10. The method of claim 9, wherein a further instruction is received at the integration platform, the further instruction indicating a of another of the plurality of adapter specific actions associated with the first adapter to be used within the integration flow; and wherein upon the selection of the another of the plurality of adapter specific actions associated with the first adapter to be used within the integration flow, the non-selected adapter specific actions are excluded from use within the integration flow.

11. The method of claim 8, wherein the first adapter comprises a connection having an invoke role within the integration flow.

12. The method of claim 11, wherein a further instruction is received at the integration platform, the further instruction indicating a selection of another of the plurality of adapter specific actions associated with the first adapter to be used within the integration flow; and wherein upon the selection of the another of the plurality of adapter specific actions associated with the first adapter to be used within the integration flow, the non-selected adapter specific actions are excluded from use within the integration flow.

13. A non-transitory computer readable storage medium, having instructions for exposing features of integration platform adapters as first-class actions in an orchestration template, which when read an executed cause a computer to perform steps comprising:

providing a computer including one or more microprocessors;

providing an integration platform running on the computer;

receiving instructions at the integration platform, the instructions comprising information indicative of an integration flow to be built within the integration platform, wherein the instructions indicate a plurality of adapters to be used within the integration flow, wherein the instructions indicate a first adapter of the plurality of adapters, the first adapter being associated with a first application external to the integration platform, to be utilized within the integration flow, the first adapter of the plurality of adapters being associated with a set of properties defined within metadata associated with the first adapter, the set of properties comprising at least action properties and runtime properties, wherein the first adapter of the plurality of adapters is associated with a role defined within the integration flow;

wherein the action properties associated with the first adapter of the plurality of adapters comprise at least a set of first-class action properties, wherein each of the set of first-class action properties are compiled during development of the first adapter and marked with specific properties including a property indicating to the first adapter to render an action based wizard for each of the set of first-class action properties;

displaying, as a set of selectable options, a determined set of a plurality of adapter specific actions associated with the first adapter of the plurality of adapters, the determined set of the plurality of adapter specific actions being selected from the set of properties associated with the first adapter, said selection excluding runtime properties, together with associated context sensitive information, via a user interface of the integration platform, each of the determined set of the plurality of adapter specific actions being associated with the defined role of the first adapter within the integration flow, each of the determined set of plurality of adapter specific actions being defined within a configuration of the first adapter of the plurality of adapters, the configuration being associated with the integration flow, wherein the determined set of the plurality of adapter specific actions are determined based upon an action of the first adapter within the integration flow;

based upon a second adapter of the plurality of adapters, the second adapter being associated with a second application external to the integration platform, the second application being different than the first application, having a same defined role within the integration flow, the second adapter of the plurality of adapters being associated with a second set of properties defined within metadata associated with the second adapter, the second set of properties comprising at least action properties and runtime properties, selecting to be displayed another determined set of a plurality of adapter specific actions, the determined another set of the plurality of adapter specific actions being selected from the second set of properties associated with the second adapter, said selection excluding runtime properties, associated with the second adapter of the plurality of adapters, wherein the another determined set of a plurality of adapter specific actions associated with the second adapter are displayed as another set of selectable options together with the display of the determined set of the plurality of adapter specific actions associated with the first adapter of the plurality of adapters; and upon an indication a selection of one of the determined set of the plurality of adapter specific actions being received via the user interface, updating the configuration of the first adapter of the plurality of adapters and accordingly modifying actions of the first adapter of the plurality of adapters within the integration flow.

14. The non-transitory computer readable storage medium, of claim 13, wherein each of the plurality of adapter specific actions associated with the first adapter are stored as extensible markup language (XML) within the metadata associated with the first adapter.

15. The non-transitory computer readable storage medium, of claim 14, wherein the first adapter comprises a connection having a trigger role within the integration flow.

16. The non-transitory computer readable storage medium, of claim 15, wherein a further instruction is received at the integration platform, the further instruction indicating a selection of another of the plurality of adapter specific actions associated with the first adapter to be used within the integration flow; and wherein upon the selection of the another of the plurality of adapter specific actions associated with the first adapter to be used within the integration flow, the non-selected adapter specific actions are excluded from use within the integration flow.

17. The non-transitory computer readable storage medium, of claim 14, wherein the first adapter comprises a connection having a trigger role within the integration flow;

wherein a further instruction is received at the integration platform, the further instruction indicating a selection of another of the plurality of adapter specific actions associated with the first adapter to be used within the integration flow; and wherein upon the selection of the another of the plurality of adapter specific actions associated with the first adapter to be used within the integration flow, the non-selected adapter specific actions are excluded from use within the integration flow.

* * * * *